(12) United States Patent
Pokhil et al.

(10) Patent No.: US 7,256,955 B2
(45) Date of Patent: Aug. 14, 2007

(54) HIGH FREQUENCY ASSISTED WRITING

(75) Inventors: Taras G. Pokhil, Arden Hills, MN (US); Victor B. Sapozhnikov, Minnetonka, MN (US); Andrzej A. Stankiewicz, Edina, MN (US); Janusz J. Nowak, Mahopac, NY (US)

(73) Assignee: Seagate Technology LLC, Scott Valley, CA (US)

(*) Notice: Subject to any disclaimer, the term of this patent is extended or adjusted under 35 U.S.C. 154(b) by 0 days.

(21) Appl. No.: 10/802,217

(22) Filed: Mar. 17, 2004

(65) Prior Publication Data
US 2005/0207050 A1 Sep. 22, 2005

(51) Int. Cl.
*G11B 5/02* (2006.01)
*G11B 5/09* (2006.01)

(52) U.S. Cl. ............................ 360/68; 360/46; 360/55

(58) Field of Classification Search ................ 360/46, 360/47, 67, 68
See application file for complete search history.

(56) References Cited

U.S. PATENT DOCUMENTS

| 5,949,600 | A | * | 9/1999 | Akiyama et al. ............. 360/55 |
| 6,011,664 | A | * | 1/2000 | Kryder et al. ................ 360/59 |
| 6,163,477 | A | | 12/2000 | Tran |
| 2004/0115481 | A1 | * | 6/2004 | Pelhos et al. ............ 428/694 T |

* cited by examiner

*Primary Examiner*—William Korzuch
*Assistant Examiner*—Daniell L. Negrón
(74) *Attorney, Agent, or Firm*—Kinney & Lange, PA

(57) ABSTRACT

Data is written to a magnetic media, by applying a magnetic write field to the magnetic media with a write pole, in conjunction with a high frequency magnetic field, to the magnetic media to assist writing to the magnetic media. The high frequency magnetic field is generated by applying a specific write current waveform to the magnetic writer, resulting in the generation of a high frequency magnetic write field.

19 Claims, 7 Drawing Sheets

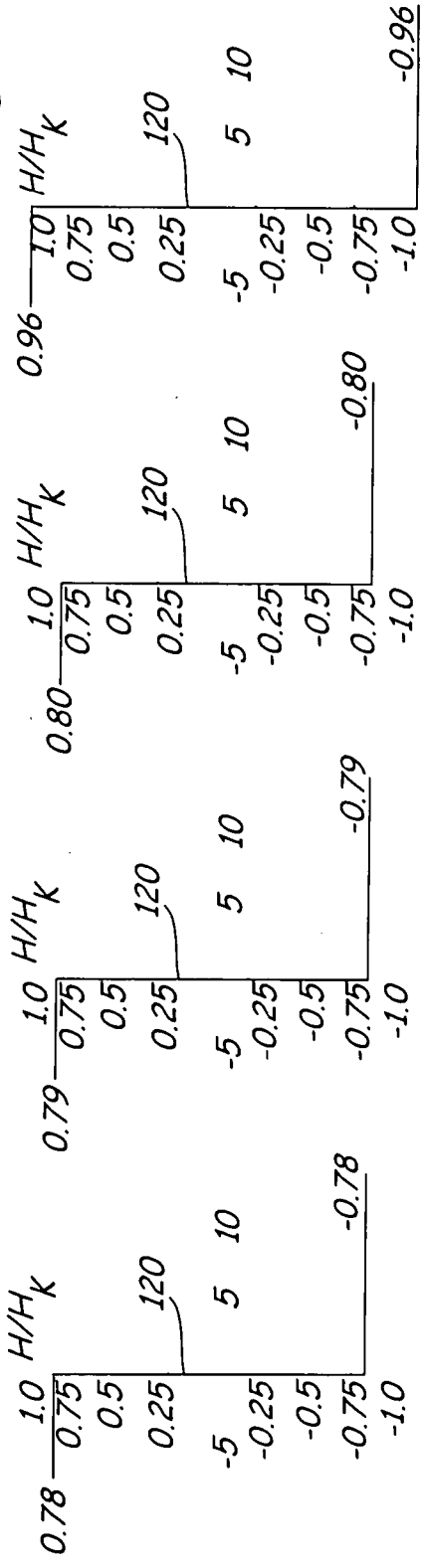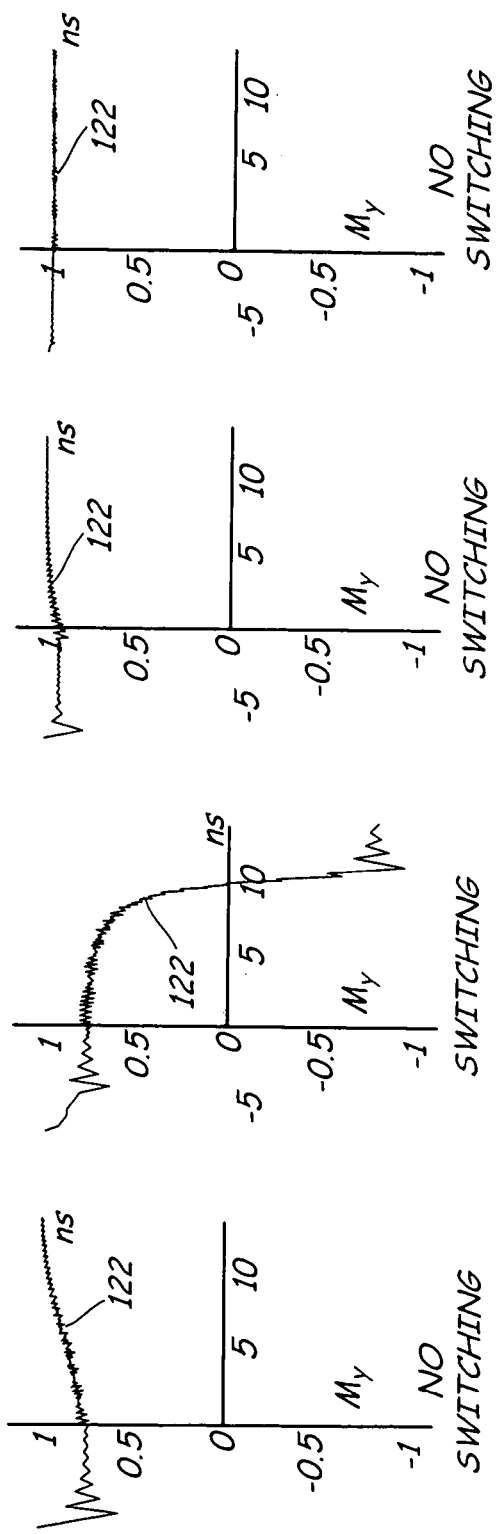
FIG. 7A  FIG. 7B  FIG. 7C  FIG. 7D $T_1 \gg T_3$
$T_3 \geq T_2$

HIGH FREQUENCY ASSISTED WRITING

BACKGROUND OF THE INVENTION

The present invention relates generally to the field of electronic data storage and retrieval systems. In particular, the present invention relates to a magnetic writing device.

A magnetic data storage and retrieval system typically includes a writer for storing magnetically encoded information on a magnetic media and a reader for retrieving the magnetically encoded information from the magnetic media. The writer typically consists of two magnetic poles, also known as a magnetic core, separated at the air bearing surface (ABS) of the write head by a write gap and connected to each other at a region away from the ABS. Positioned between the two poles are one or more conductive coil layers encapsulated by insulating layers. To write data to the magnetic media, a time varying write current is caused to flow through the conductive coil, which in turn produces a time varying magnetic field through the poles. The magnetic media is then passed near the ABS of the writer at a predetermined distance such that the media passes through the magnetic field. As the write current changes in direction and magnitude, the magnetic field changes in direction and magnitude as well. In a typical magnetic writer, a sufficient magnetic field must be applied to the disc medium in order to write to the magnetic media. More specifically, the field produced by the head at the magnetic media must be of sufficient magnitude to overcome the high coercivity of the magnetic media.

The increasing density of stored information on magnetic storage devices necessitates the availability of writing methods that allow magnetic writing with high a real density. Magnetic media which support a high density of stored information and at the same time are stable (stored information does not degrade with time) are usually characterized by high coercivity and high magnetic anisotropy. Typically, writing on such media (switching the local direction of magnetization) requires a high magnitude magnetic field. Currently, magnetic writers are based on the idea of focusing the magnetic field from the pole towards the magnetic media. Several factors, however, hinder further advance of this writing method, including the value of saturation magnetization of top pole materials, process technologies involved in producing a top pole of a very small size, and difficulties in further reduction of the flight height.

BRIEF SUMMARY OF THE INVENTION

In order to write data to a magnetic media, a write current is caused to flow through coils wrapped around a write pole. The write current contains a first component that generates a magnetic write field having a spatial gradient. The write current contains a second component that generates a high frequency magnetic field. The magnetic write field, along with the high frequency magnetic field, are applied to a magnetic media. The frequency of the high frequency field is selected based on the physical properties of the magnetic media, along with the magnitude of the magnetic write field. When the frequency of the high frequency field and the magnitude of the magnetic write field are selected properly, magnetic resonance will occur in a certain region of the magnetic media. In this area, spin precession of the magnetic particles is excited. Excited spins in a magnetic media allow for easier switching of the direction of magnetization of the magnetic media than areas where the spins are not excited, so that writing occurs in the excited areas.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7A-D are graphical representations of the relationship between the magnitude of the magnetic write field and the ability to switch the magnetization direction of the magnetic media.

DETAILED DESCRIPTION

Figure 1:
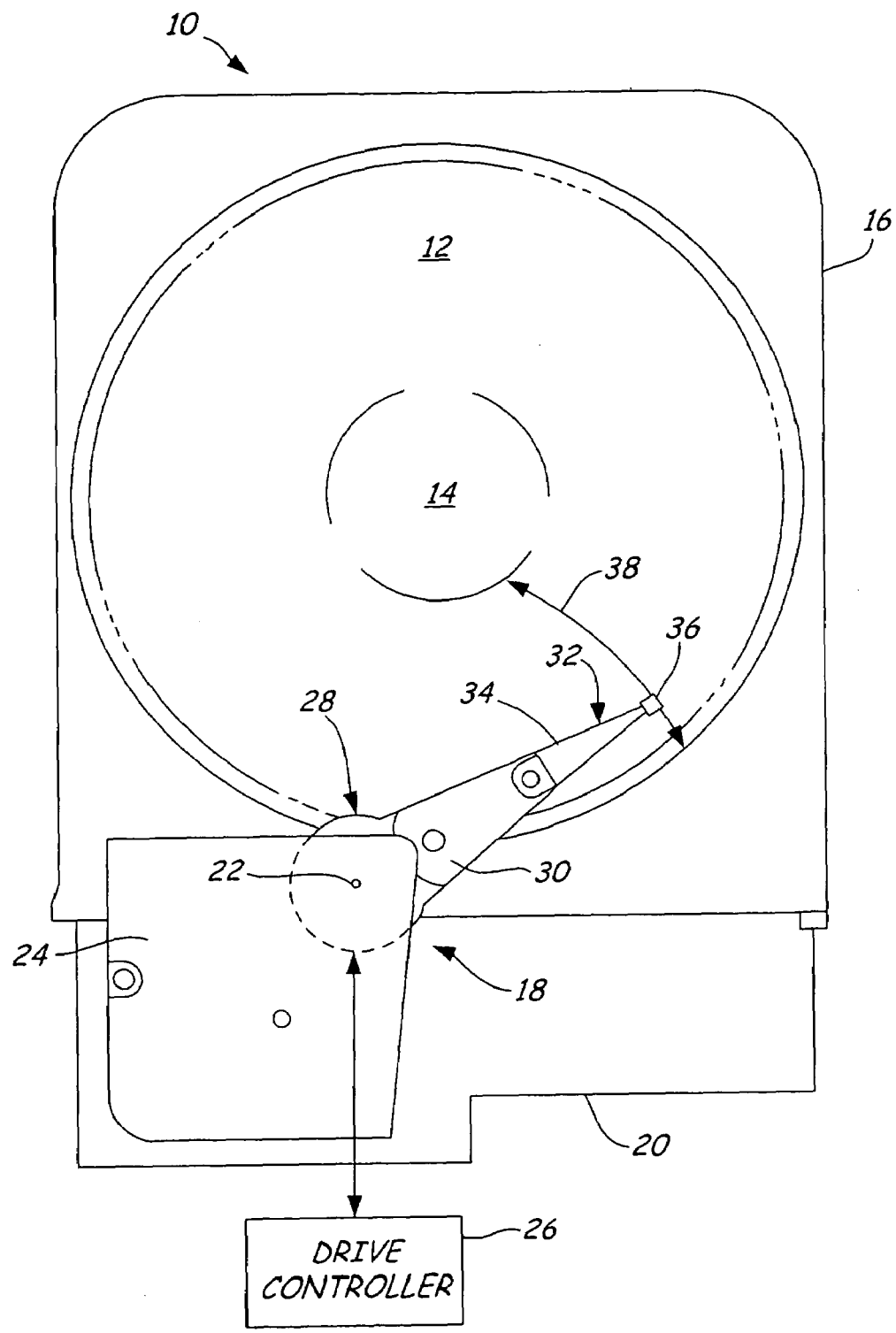
FIG. 1 is a top view of a typical disc drive system employing a read/write transducing head.

FIG. 1 is a top view of a typical disc drive system 10. The disc drive system 10 includes a magnetic disc 12 mounted for rotational movement about an axis defined by a spindle 14 within a housing 16. The disc drive system 10 also includes an actuator 18 mounted to a base plate 20 of the housing 16, with the actuator 18 being pivotally movable relative to the disc 12 about an axis 22. A cover 24 covers a portion of the actuator 18. A drive controller 26 is coupled to the actuator 18. The drive controller 26 is either mountable within the disc drive system 10 or is located outside of the disc drive system 10 with suitable connection to the actuator 18. The actuator 18 includes an e-block assembly 28, an actuator arm 30 and a head suspension assembly 32. The head suspension assembly 32 includes a load beam 34 coupled to the actuator arm 30 and an air bearing slider 36 coupled to the load beam 34 by a flexure. The slider 36 carries a read/write transducing head, not shown in this view. The write head component of the typical disc drive system 10, may include a high frequency assisted magnetic writer.

During operation, the drive controller 26 receives position information indicating a location on the disc 12 to be written. Based on the position information, the drive controller 26 provides a position signal to the actuator 18, which causes the actuator 18 to pivot about the axis 22. The movement causes the slider 36 to move radially over the surface of the disc 12 in a path indicated by arrow 38. The drive controller 26 and the actuator 18 operate in a known manner so that the read/write transducing head carried by the slider 36 is positioned over the desired location of the disc 12. Once the read/write transducing head is properly positioned, a desired read or write operation is performed. The operation of the disc drive system 10, as described above, remains the same when the high frequency assisted magnetic writer of the present invention is operated within the read/write transducing head.

Figure 2:
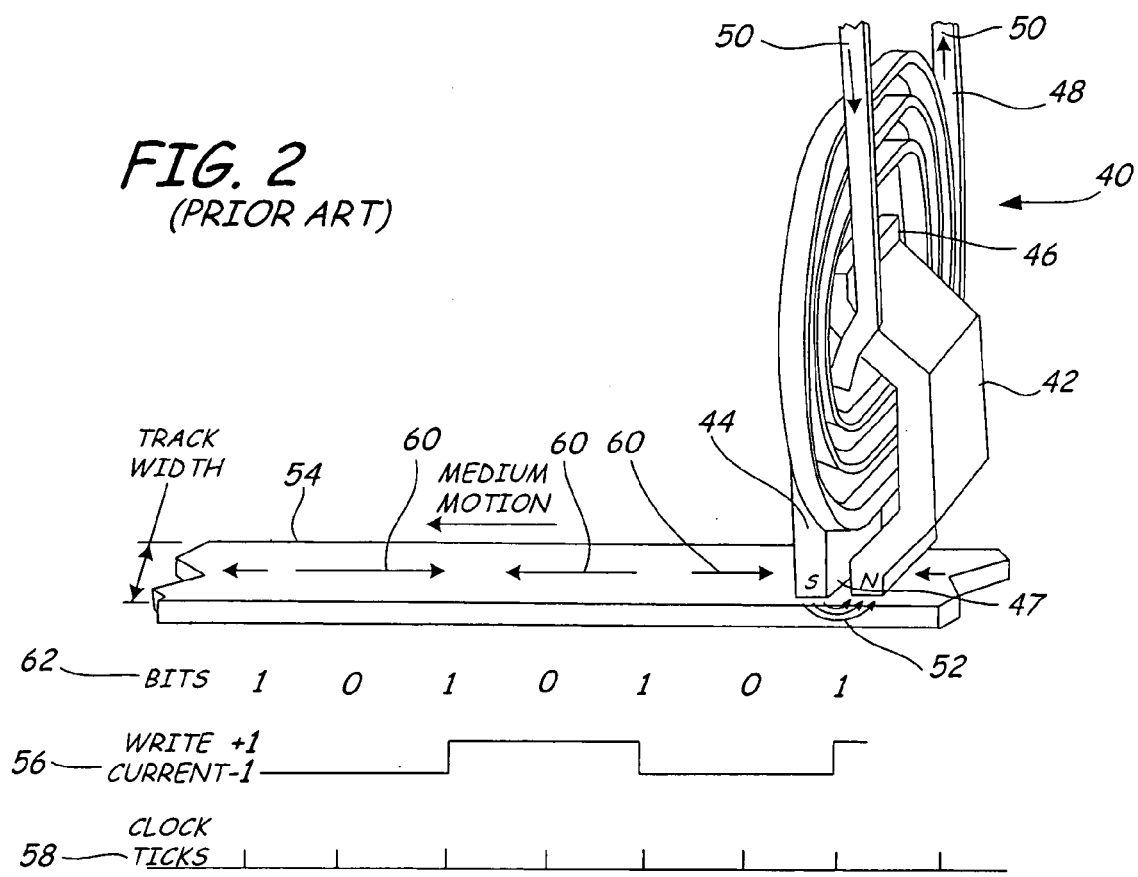
FIG. 2 is a perspective view of a typical magnetic writer.

FIG. 2 is a perspective view of a typical magnetic writer 40. The magnetic writer 40 includes a top pole 42, a bottom pole 44, a top via 46, and a conductive coil 48. The top pole 42 and the bottom pole 44 are physically connected by the top via 46 at the top of the magnetic writer 40. At the bottom of the magnetic writer 40, the top pole 42 and the bottom pole 44 are separated by a write gap 47. The conductive coil 48 is wound between the top pole 42 and bottom pole 44 as shown in FIG. 2. A write current 50, driven through the conductive coil 48, will generate a magnetic write field 52. The direction of the write current 50 dictates the direction of the magnetic write field 52 and the magnitude of the write current 50 dictates the magnitude of the magnetic write field 52. A magnetic media 54 is located in close proximity to the write gap 47, such that the magnetic write field 52 passes through the magnetic media 54. Magnetic media 54 may be a rotatable magnetic disc, similar to magnetic disc 12 shown in FIG. 1, or may be any other type of magnetic media that is magnetizable by magnetic write field 52.

Operation of the magnetic writer 40 is shown graphically with a time-dependent waveform graph representing the write current 50. A resulting direction of magnetization 60 of the magnetic media 54 and a series of data bits 62 written to the magnetic media 54 are also illustrated. The direction of magnetization 60 is directly related to the direction of the write current 50, described in the waveform as a positive or negative current. When the write current 50 flows in a particular direction, the direction of the magnetic write field 52 will point in a direction derived from the right hand rule. If the magnitude of the magnetic field 52 is sufficient, the direction of magnetization 60 within the magnetic media 54 will switch to point in the same direction as the magnetic write field 52. When the write current 50 is reversed, the direction of the magnetic write field 52 will be reversed, resulting in a magnetic write field pointing in the opposite direction as before. Accordingly, if the magnitude of the magnetic write field 52 is sufficient, the direction of magnetization 60 within the magnetic media 54 will point in the same direction as the magnetic write field 52.

In this description of a typical magnetic writer 40, the direction of magnetization 60 of the magnetic media 54 is parallel to the surface of the magnetic media 54. Therefore, this is known in the art as a parallel writer. In other embodiments, a direction of magnetization of a magnetic media may be perpendicular to the surface of the magnetic media. This is known in the art as a perpendicular writer. The present invention is applicable to either type of writer.

Figure 3:
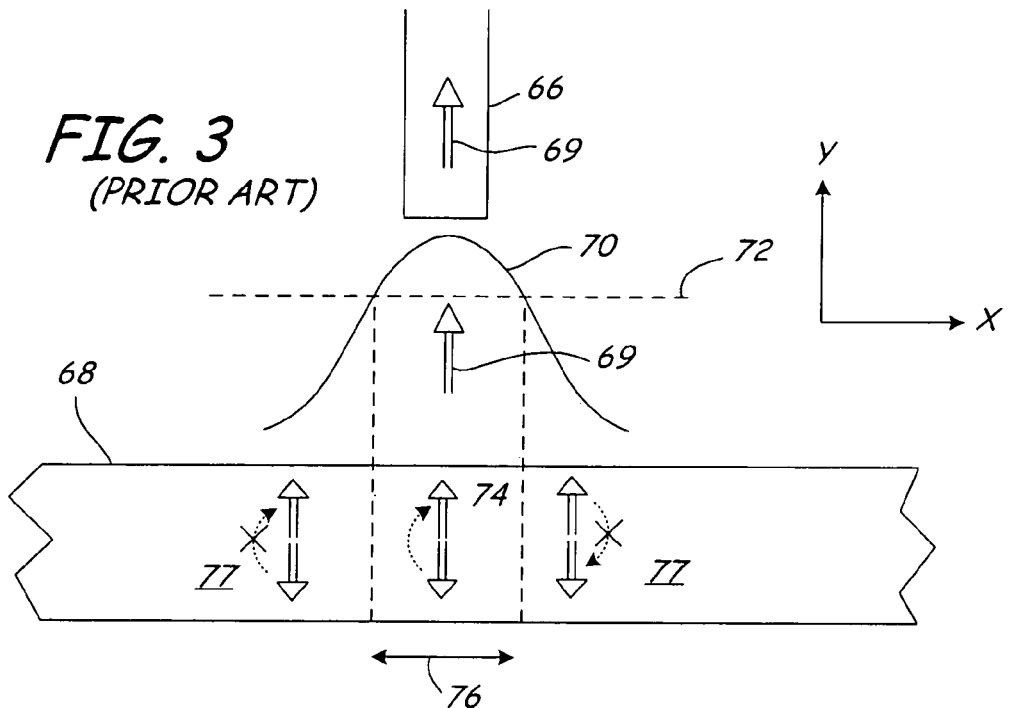
FIG. 3 is a side view diagram illustrating the operation of a typical magnetic writer located in the read/write transducing head of a typical disc drive system.

FIG. 3 is a diagram illustrating a typical magnetic writer 66 and a section of magnetic media 68. As described in FIG. 2, a typical magnetic writer may include a top pole 42, and a bottom pole 44. Because the structure of the write pole is not critical to this invention, the magnetic writer 66 has been simplified to a block diagram. The magnetic writer 66 generates a vertical magnetic write field 69, in either the negative or positive y-direction. This embodiment called a perpendicular writer, because the magnetic media 68 will be magnetized in a direction perpendicular to the media plane. The magnitude of the magnetic write field 69 varies in space as shown by curve 70, and depends on the distance from the magnetic writer 66. When the magnitude of the magnetic write field 69 exceeds a threshold magnetization level 72, then the magnetic write field 69 is sufficient to change the direction of magnetization 74 of the magnetic media 68. This area, in which the magnetic write field 69 is of sufficient magnitude to switch the direction of magnetization 74 of the magnetic media 68, is labeled as write width 76. When the magnitude of the magnetic write field 69 is below the threshold magnetization level 72, then the magnetic write field 69 will not be of sufficient magnitude to switch the magnetization direction 77 in the magnetic media 68.

As illustrated in FIG. 3, the write width 76 for a typical magnetic writer 66 is dependent on the width of the magnetic write field 69 created by the magnetic writer 66 that exceeds the threshold magnetization level 72. The industry is constantly pushing for higher and higher areal density rates in disc drive technology. One way to achieve higher areal densities is to narrow the write width 76. Most attempts to narrow the write width 76 focus on generating a more narrowly concentrated magnetic write field 69, usually by decreasing the physical size of the magnetic writer 66. The present invention offers an alternative system for narrowing the write width 76.

Figure 4:
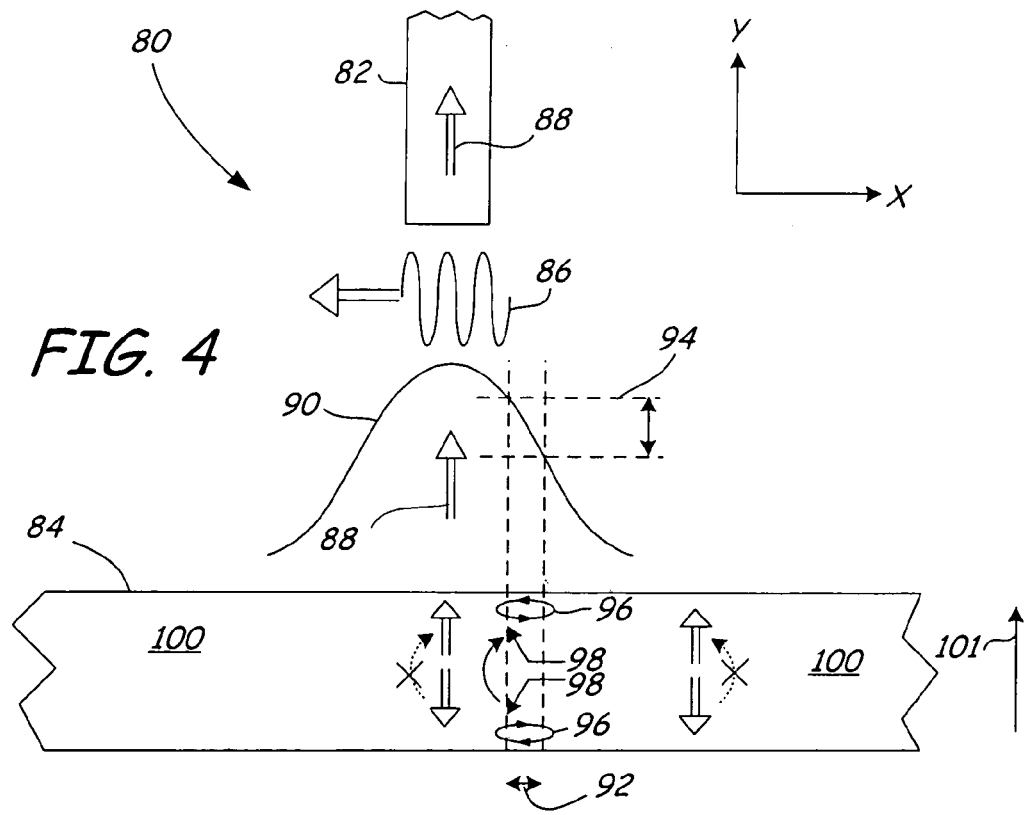
FIG. 4 is a side view diagram illustrating the operation of a high frequency assisted magnetic writer located in the read/write transducing head of a typical disk drive system.

FIG. 4 is a diagram illustrating an exemplary embodiment of the present invention, showing the operation of a high frequency assisted magnetic writer 80 located in the read/write transducing head of a disc drive system. The diagram shows a magnetic writer 82, a magnetic media 84, a high frequency magnetic field 86, and a magnetic write field 88 having a magnitude that varies in space as shown by curve 90. In this embodiment, the magnetic writer 82 is a perpendicular writer, although a number of magnetic writers known in the prior art maybe used in the present invention, including both longitudinal and perpendicular writers of varying designs. For ease of illustration, the magnetic writer 82 has been shown as a block diagram.

A write current, not shown in this figure, is applied to the magnetic writer 82. The write current generates a magnetic write field 88 in magnetic writer 82, which in the perpendicular embodiment of FIG. 4 results in a vertical magnetic write field 88. The direction of the magnetic write field 88 can be either upward or downward, depending on the direction of the write current. In this embodiment, the magnetic write field 88 has a direction of magnetization pointing in the upward direction as indicated by the arrow. The magnitude of the magnetic write field 88 varies in space as shown by curve 90. As expected, the magnitude of the magnetic write field 88 is greater near the magnetic writer 82. The magnitude of the magnetic write field 88 lessens as one moves further away from the magnetic writer 82. The magnitude of the magnetic write field 88, as shown by curve 90, is not dependent on the direction of the magnetic write field 88. Thus, regardless of the direction of the magnetic write field 88, the magnitude of the magnetic write field 88 as shown by curve 90 will remain the same.

The high frequency magnetic field 86 can be generated in a number of ways. In the embodiments of the present invention, the high frequency magnetic field 86 is created in part by the write current, as described in FIGS. 5 and 6 below. In one embodiment, the write current applied to the magnetic writer 82 creates magnetic precession within the magnetic writer, which in turn generates the high frequency magnetic field 86. In another embodiment, the write current applied to the magnetic writer 82 directly creates the high frequency magnetic field 86.

As FIG. 4 shows, the high frequency magnetic field 86 is applied to the magnetic media 84 simultaneously with the magnetic write field 88. Magnetic media 84 may be a rotatable magnetic disc, similar to magnetic disc 12 shown in FIG. 1, or may be any other type of magnetic media that can be written to by the combination of high frequency magnetic field 86 and magnetic write field 88. The simultaneous combination of the high frequency magnetic field 86 with the magnetic write field 88 induces magnetic spin resonance 96 in a portion 92 of the magnetic media 84. The induction of magnetic spin resonance 96 in a portion of the magnetic media 84 is dependent on the physical properties of the magnetic media 84, the frequency of the high frequency magnetic field 86, and the gradient of magnetic write field 88 as shown by curve 90. In this embodiment, the portion of gradient curve 90 that induces resonance is labeled as region 94. The resonance conditions can be adjusted, or tuned to a particular magnetic writer 80 by adjusting the anisotropy of the magnetic media 84. In the portion of the magnetic media 84 in which magnetic resonance is induced, spin precession 96 of the magnetic media 84 is excited. When the spins 96 are excited, the magnetization direction 98 of the resonance induced portion 92 of the magnetic media 84 is switched more easily than in an area of the magnetic media 84 in which magnetic resonance conditions have not been met, labeled as sections 100 within the magnetic media 84. Thus, in the region of magnetic resonance 92, the magnetic media 84 is magnetically "softer." Therefore, the magnetic media 84 is only written to, i.e. the direction of magnetization 98 switched, in the area where magnetic resonance 92 causes excitation of the spin precession 96. In sections of the magnetic media 84 in which the conditions for magnetic resonance are not met, the magnetic write field 88 does not have the ability to switch the direction of magnetization, as shown in section 100 of the magnetic media 84. As shown in FIG. 4, the magnetic media 84 is not necessarily written in the areas where the magnitude of the magnetic write field 88 is greatest. Despite the greater magnitude of the magnetic write field 88, the proper conditions for resonance have not been met in sections 100 of the magnetic media 84, and therefore the magnetic writer 80 is unable to change the direction of magnetization.

The area of magnetic resonance 92 may be induced by any range of write field magnitudes located along curve 90, but is not necessarily located at the peak of magnitude curve 90. This distinguishes it from typical magnetic writers, as shown in FIG. 3, in which the magnetic media is written where the magnitude of the magnetic field is the greatest. In the present invention, the magnetic media 84 is written where the magnitude of the magnetic write field 88 is properly tuned to create an area of magnetic resonance 92 in the magnetic media 84. In order to achieve a narrow area of magnetic resonance 92, and therefore a more narrow write width, the high frequency magnetic writer 80 is tuned such that spin precession 96 is induced by the steepest gradient portion of the magnitude curve 90. The resulting narrow area of magnetic resonance 92, allows the high frequency assisted magnetic writer 80 to achieve higher areal densities than a typical writer. This embodiment is further distinguished by the method in which the high frequency magnetic field 86 is generated, either by creating magnetic precession within the magnetic writer 82 by way of the write current, or by direct manipulation of the write current and resulting magnetic write field 88. These embodiments are preferred over the prior art, which would require some externally generated high frequency magnetic field to be added to the read/write transducer head. By utilizing the features of typical magnetic writers, the present invention creates a high frequency magnetic field 86 with minimal adjustments to the magnetic writer. A further benefit of the high frequency assisted writer 80 is the material that can be used in the magnetic media 84. Because directions of magnetization within the magnetic media 84 are not switched by sheer magnitude of the magnetic write field 88, but rather by the creation of precise areas of magnetic resonance 92, the magnetic media 84 can be formed of materials with higher coercivity. As is known in the art, magnetic materials with a higher coercivity are more stable magnetically than materials of a lower coercivity. Furthermore, the present invention can be utilized to relax the requirement on the magnitude of the magnetic write field 88, because the magnetic media 84 is not written to by sheer magnitude of the magnetic write field 88.

Figure 5:
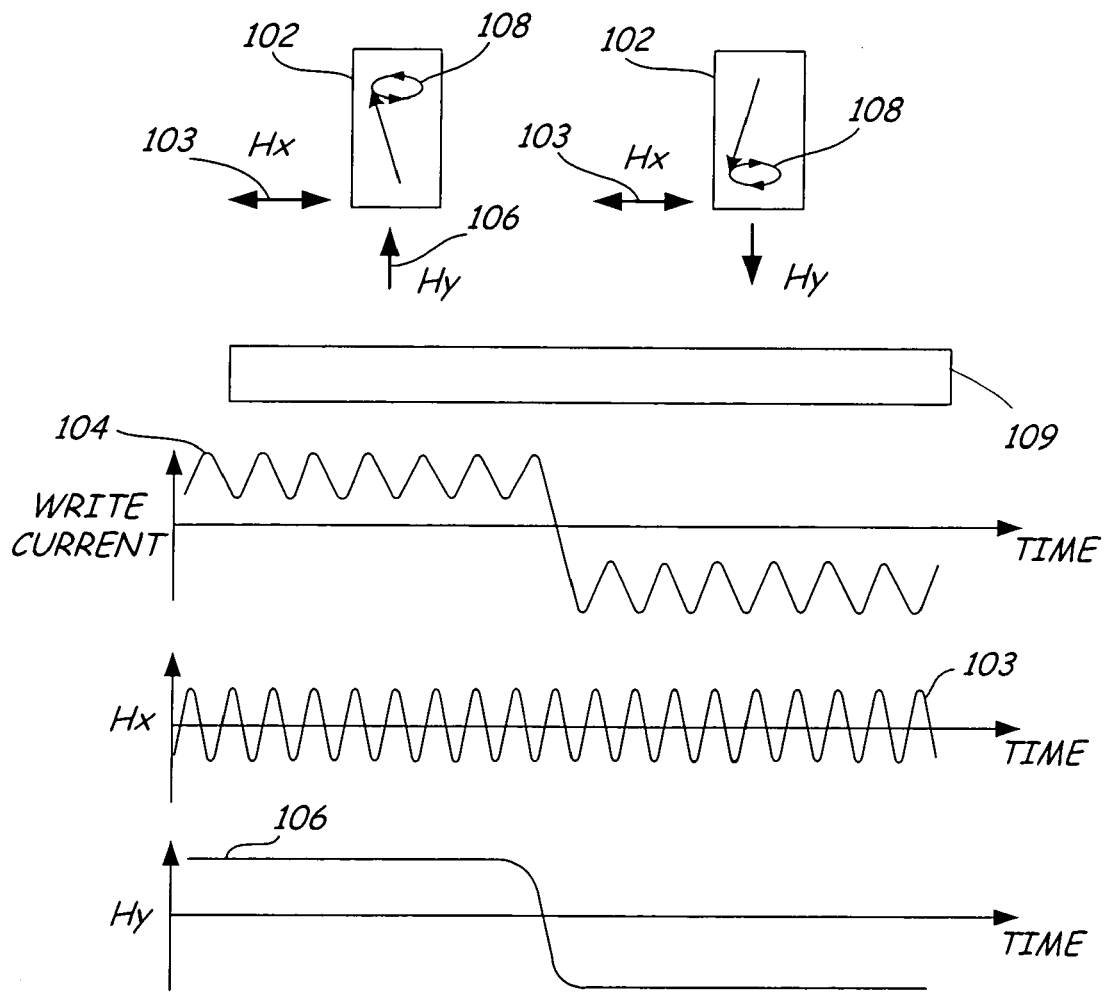
FIG. 5 illustrates an embodiment of the present invention in which spin precession in the write pole generates a high frequency magnetic field.

FIG. 5 is a diagram illustrating an embodiment of the present invention, showing the generation of the high frequency magnetic field 103 for use in the high frequency assisted magnetic writer 80. A write current 104 is applied to a magnetic writer 102. The write current 104 includes both a high frequency and low frequency component. The low frequency component corresponds with a typical write current as is known in the prior art, and is responsible for the generation of a magnetic write field 106. The high frequency component is responsible for the generation of the high frequency magnetic field 103.

FIG. 5 shows the magnetic writer 102 in two different states. In the first state the write current 104, having a "positive" direction as shown by the left side of time-dependent graph labeled "Write Current", is applied to magnetic writer 102. The write current 104 generates within magnetic writer 102 a magnetic write field 106 with a "high" or "positive" direction, as shown by the left side of time-dependent graph labeled "Hy". In the second state the write current 104 has been reversed, resulting in a "low" or "negative" direction, as shown by the right side of time-dependent graph labeled "Write Current". The write current 104 now generates within magnetic writer 102 a magnetic write field 106 with a "low" or "negative" direction, as shown by the right side of time-varying graph labeled "Hy". As discussed above, the direction of the write current 104 dictates the direction of the magnetic write field 106.

As stated above, the write current 104 of the present invention includes an embedded high frequency component, as shown by the small rapid oscillations in the time-dependent graph labeled "Write Current". This is in addition to the typical write current signal as known in the prior art, and shown in FIG. 2. The high frequency component is added to a traditional write current in one of several ways. In one embodiment of the present invention, the coils carrying the traditional write current around the magnetic writer 102 may be tuned to allow rapid oscillations, or high frequency ringing, following the transition in the write current from a "positive" direction to a "negative" direction, and vice versa. This is a result of overshoot when the direction of the traditional write current is switched. It is a well known phenomenon in magnetic writing technology, but one that is normally thought of as detrimental to operation. By properly tuning the current carrying coil and traditional write current characteristics, this phenomenon results in a traditional write current having a high frequency component, as shown by the write current 104 in FIG. 5. In another embodiment, a separate high frequency signal component is modulated with a traditional write current resulting in the write current 104 as shown FIG. 5.

In this embodiment, the high frequency component of the write current 104 has the effect of causing magnetic precession 108 within the magnetic writer 102. The magnetic precession 108 within the magnetic writer 102 spins about a vertical axis drawn through the magnetic writer 102. This rotation about the vertical axis generates the high frequency magnetic field 103 in a horizontal axis, which is to say parallel to the magnetic media 109. The resultant high frequency magnetic field 103 is shown by the time-dependent graph labeled "Hx". As shown in FIG. 5, changes in the direction of the write current 104, and thus changes in direction of the magnetic write field 106, have no effect on the high frequency magnetic field 103. The combination of magnetic write field 106 and high frequency magnetic field 103 creates the area of magnetic resonance in the magnetic media 109, as described above in FIG. 4.

Figure 6:
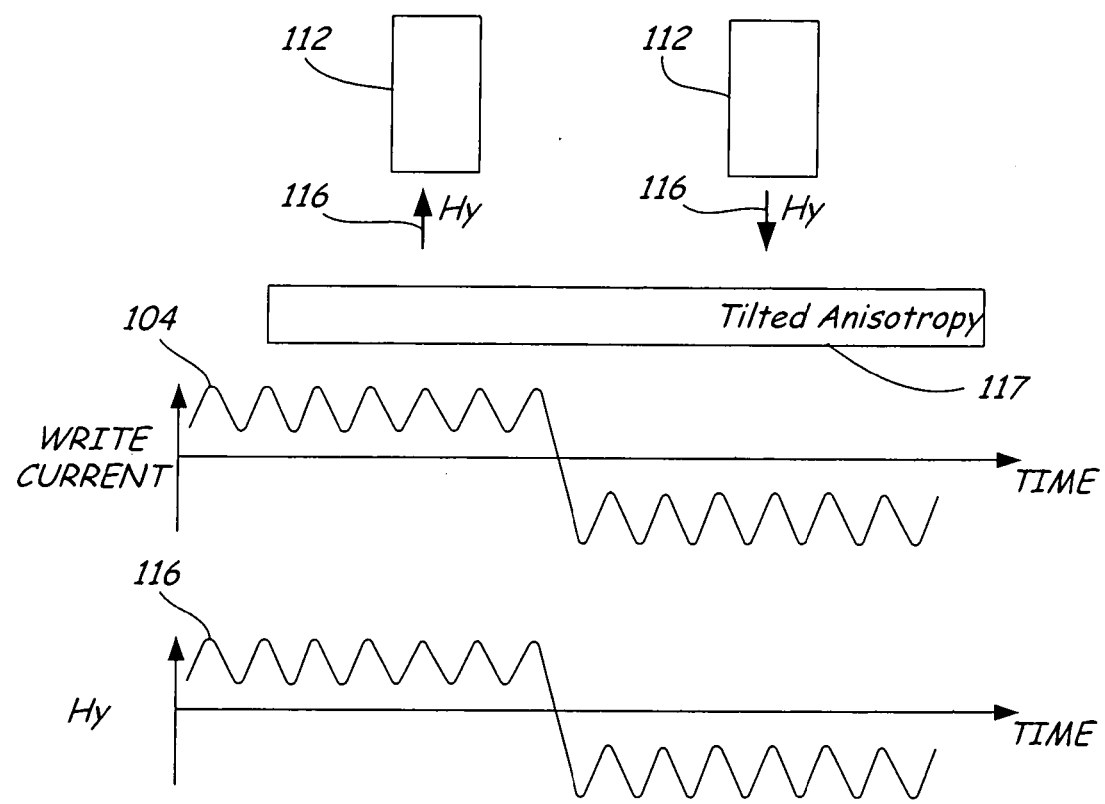
FIG. 6 illustrates an embodiment of the present invention in which the high frequency magnetic field is embedded within the write field.

FIG. 6 is a diagram illustrating another embodiment of the present invention, showing the generation of a write field 116 having a high frequency component. A magnetic writer 112 is again shown in two states. The write current 104 remains unchanged from the description in FIG. 5. At a first point in time, the write current 104 has "high" or "positive" direction, and a "low" or "negative" direction at the second point in time, as illustrated by the time-dependent graph labeled "Write Current". As above, the write current 104 has an embedded high frequency component. The high frequency component of the write current 104 can be generated in either of the methods discussed above.

Unlike the embodiment of the present invention shown in FIG. 5, the write current 104 does not create magnetic precession within magnetic writer 112 in the embodiment of FIG. 6. Instead, the write current 104 generates a single magnetic field 116, which carries both the traditional magnetic write field signal, along with the high frequency magnetic field signal. As can be seen in FIG. 6, the shape of the magnetic field 116 corresponds with the shape of the write current 104. The high frequency magnetic field, as required by the high frequency assisted magnetic writer, is embedded within the resulting magnetic field 116. Likewise, the magnetic write field known in the prior art and described in FIGS. 4 and 5 is also a component of the magnetic field 116.

The resulting high frequency field generated in this embodiment differs from the high frequency field shown in FIG. 5 in that the high frequency field of this embodiment operates in the vertical plane, defined by Hy. The high frequency field described in FIGS. 4 and 5 operated in the horizontal plane defined by Hx. A benefit of the high frequency field of the present embodiment, is that the vertical direction of the high frequency field makes this embodiment particularly well suited for use when a magnetic media 117 to be written has a tilted anisotropy. Again, the high frequency magnetic field component of magnetic field 116 operates along with the magnetic write field component of magnetic field 116 to create resonance within the magnetic media 117.

FIGS. 7A-D are a series of graphical representations of the relationship between the magnitude of the magnetic write field and the ability to switch the magnetization direction of the magnetic media, assisted by a high frequency magnetic field of an established frequency. The structure as defined in FIG. 4 is the basis for this model, but specific values have been assigned to better illustrate the operation of the invention. Therefore, the structure of FIG. 4 is used to describe the graphical representations of FIGS. 7A-D. The graphical representations are calculated using a dynamic magnetic model based on the Landau-Lifshitz-Gilbert equation. For purposes of this model, the magnetic media is assigned a saturation magnetization ($M_s$) of 400 emu/cm$^3$. The saturation magnetization, $M_s$, is the magnetization when all atomic spins are lined up in the same direction. The magnetic media is assigned a magnetocrystalline uniaxial anisotropic field ($H_k$) of $2\pi M_s$. The anisotropic field refers to the fact that even when no magnetic fields are applied to a magnetic material, the direction of magnetization prefers to point in certain directions called easy axes. Therefore, if no external magnetic field is applied, the magnetic media would have a magnetization magnitude of $2\pi M_s$ and would point in the direction of an easy axis. The easy axis points in a vertical direction, perpendicular to the surface of the magnetic media. To illustrate the difference between the prior art and the present invention, the magnitude of the magnetic write field applied to the magnetic media will be expressed as $H/H_k$, or the normalized magnetic write field 120. In tests of an exemplary embodiment, high frequency field applied to the magnetic media creates magnetic resonance in the magnetic media when the magnitude of the normalized magnetic write field 120 equals 0.79. (as shown in FIG. 7B).

In FIGS. 7A-D, the direction of the normalized magnetic write field 120 is switched from a positive y-direction to a negative y-direction. The switch is approximated as a step function, happening instantaneously, and the magnitude of the normalized magnetic write field 120 is the same (but opposite) after the step as it was before the step. The y-component of media magnetization 122 is displayed in the waveform graph directly below the normalized magnetic write field 120 step function graph. A positive value of media magnetization 122 indicates a direction of magnetization in the positive y-direction. A negative value of media magnetization 122 indicates a direction of magnetization in the negative y-direction. As the normalized magnetic write field 120 is forced negative, indicating a negative y-direction magnetic write field, the direction of media magnetization 122 will switch to a negative y-direction, and the magnetic media is written. If the media magnetization 122 is not switched to a negative y-direction in the presence of a negative y-direction magnetic write field, then the magnetic media has not been written.

FIG. 7A shows the step function for the normalized magnetic write field 120, with a magnitude of 0.78. Therefore, the magnitude of the normalized magnetic write field 120 is below the 0.79 requirement to create magnetic resonance in the magnetic media. The direction of media magnetization 122 does not switch to a negative y-direction, indicating that the magnetic media was not written. This figure nicely illustrates the inability of the magnetic write field 120, which is not within the required range to create resonance within the magnetic media, to switch the direction of media magnetization 122. If the magnetic write field 120 cannot switch the direction of the media magnetization 122 of the magnetic media, then it cannot write data to the magnetic media.

FIG. 7B shows the normalized magnetic write field 120 with a magnitude of 0.79. Based on the properties assigned to the magnetic media and the frequency of the high frequency field for purposes of this model, this is the optimal magnitude of the magnetic write field 120. That is to say, that magnetic resonance is induced at this magnitude for the normalized magnetic write field 120. When magnetic resonance is induced in the magnetic media, the magnetization direction will be easier to switch, allowing the magnetic media to be written. Therefore, the normalized magnetic write field 120 has the proper amplitude to create magnetic resonance within the magnetic media. The direction of media magnetization 122 switches from a positive y-direction, to a negative y-direction, indicating that the magnetic media was written with new data.

FIG. 7C shows the normalized magnetic write field 120 with a magnitude of 0.80. As the figure demonstrates, the normalized magnetic write field 120, despite the higher magnitude, is unable to switch the direction of media magnetization 122. Therefore, the magnitude of the normalized magnetic write field 120 is above the 0.79 requirement to create magnetic resonance in the magnetic media. The direction of media magnetization 122 does not switch to a negative y-direction, indicating that the magnetic media was not written. This figure nicely illustrates the inability of the magnetic write field 120, which is not within the required write field resonance range, to switch the direction of media magnetization 122. In particular, this figure is interesting because the magnitude of the magnetic write field 120 is greater than the magnitude of the magnetic write field 120 that successfully switched the magnetic media in FIG. 7B.

FIG. 7D shows the normalized magnetic write field 120 with a magnitude of 0.96. The magnitude of the magnetic write field 120 is therefore much higher in this figure than it was in FIGS. 7A-C. The magnitude of the magnetic write field 120 is not within the required range to create magnetic resonance in magnetic media however. Despite the increased magnitude of the magnetic write field 120, the direction of media magnetization 122 is not switched to the negative y-direction, indicating that no data is written. This figure illustrates the significance of creating magnetic resonance in the magnetic media. Despite the application of a much stronger magnetic write field 120, the magnetic media is still not written. The only magnetic write field 120 that was able to switch the direction of media magnetization 122, was the magnetic write field 120 that was properly tuned to create magnetic resonance in the magnetic media.

FIGS. 7C and 7D illustrate a unique difference between the operation of a typical magnetic writers and the high frequency magnetic writer as shown in these figures. In the typical magnetic writer, the higher the amplitude of the magnetic write field, the easier it is to switch the direction of magnetization. In the high frequency assisted magnetic writer, a higher magnetic write field amplitude does not translate to switching of the direction of magnetization. More important in the high frequency assisted magnetic writer is finding the proper amplitude to create magnetic resonance in the magnetic media.

Figure 8:
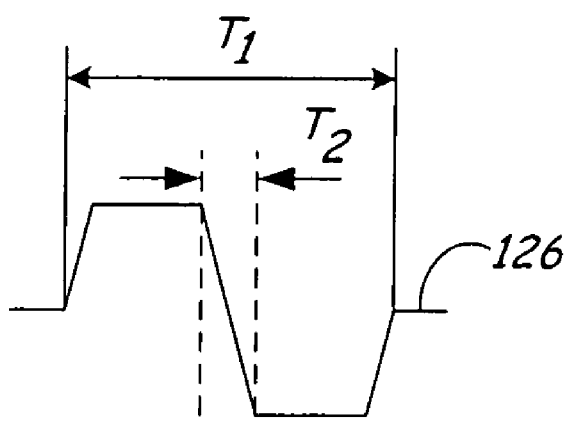
FIG. 8 is a diagram illustrating the relationship between the time intervals of the high frequency assisted magnetic writer.
Figure 8:
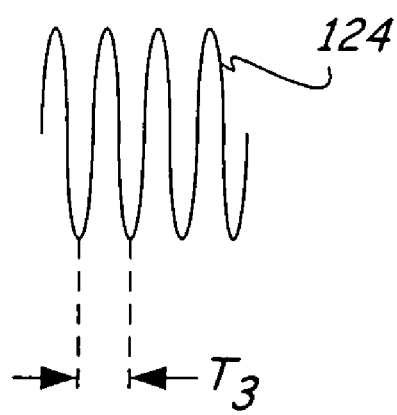

FIG. 8 is diagram illustrating the timing relationships between a high frequency magnetic field 124 and the magnetic write field 126. There are particular values that are important. T1 refers to the period of the magnetic write field 126. It takes one period T1 of the magnetic write field 126 to write to the magnetic media. T2 refers to the switching time between positive and negative magnitude's of magnetic write field 126. T3 refers to the period of the high frequency magnetic field 124. General guidelines detailing the timing relationships between the high frequency magnetic field 124 and the magnetic write field 126 help ensure that the magnetic media is written to. First, the period of the high frequency magnetic field, T3, should be much smaller than the period of the magnetic write field, T1. For instance, if T1 has a period of 1 ns (frequency of 1 GHz), then T3 should not have a period any shorter than 0.1 ns (frequency of 10 GHz). If the period of the magnetic write field T1 is not much larger than the period of the high frequency magnetic field, then the magnetic write field 126 may induce unwanted resonance within the magnetic media 84. Second, the switching time, T2, between positive and negative magnitudes of magnetic write field 126 should be equal or smaller than the period T3 of the high frequency magnetic field 124. For instance, if the period T3 of the high frequency magnetic field 124 is 0.1 ns (frequency of 10 GHz), then the switching time T2 between positive and negative magnitudes of the magnetic write field 126 should be equal to or less than 0.1 ns. If this condition is not met, then resonance might be induced in a larger than intended area of the magnetic media 84 during switching of the magnetic write field 126 from positive to negative.

The present invention provides a high frequency assisted magnetic writer, which writes data to a magnetic media not by the sheer magnitude of the magnetic write field, but rather by the creation of magnetic resonance in a specific, narrow area within the magnetic media. The present invention provides a unique way of producing the high frequency magnetic field. In one embodiment, the high frequency magnetic field is generated by applying a specific write current waveform to the magnetic writer, producing magnetic precession within the magnetic writer, which in turn generates the high frequency magnetic field. In another embodiment, the high frequency magnetic field is generated by applying a specific write current waveform, with an embedded high frequency component, resulting in a magnetic write field with a corresponding high frequency component. The benefits of a high frequency assisted magnetic writer include narrower write widths within the magnetic media, which leads in turn to increased areal densities. Furthermore, because the magnetic media is written not by sheer magnitude of the magnetic write field, but by magnetic resonance, the magnetic media can be made with higher coercivity materials than would be possible with a typical magnetic writer. The higher coercivity means the magnetic media will be more stable. Without the need for high magnitude magnetic write fields to forcibly write the magnetic media, the need for higher and higher magnitude magnetic writers can be diminished. Also, the gradient of the magnetic write field where resonance is induced can be selected to allow a narrower write width, diminishing the need for further reduction in the size of the magnetic write head and in the spacing between the magnetic write head and the media.

Although the present invention has been described with reference to preferred embodiments, workers skilled in the art will recognize that changes may be made in form and detail without departing from the spirit and scope of the invention.

The invention claimed is:

1. A method of writing to a magnetic media, the method comprising:
    producing a current in a coil by configuring a current generation circuit to produce a high frequency oscillation in the current following a transition of the current from one direction to the opposite direction, wherein the current generates a magnetic write field and a high frequency magnetic field; and
    wherein the magnetic write field and the high frequency magnetic field create an area of magnetic resonance within the magnetic media.

2. The method of claim 1, wherein the current causes magnetic precession within a magnetic write pole.

3. The method of claim 2, wherein the magnetic precession within the magnetic write pole generates the high frequency magnetic field.

4. The method of claim 1, wherein the high frequency magnetic field is oriented parallel to the magnetic media.

5. The method of claim 1, wherein the high frequency magnetic field is oriented perpendicular to the magnetic media.

6. The method of claim 1, further including selecting the magnetic media and frequency of the high frequency magnetic field such that a magnitude of the magnetic write field that will create magnetic resonance within the magnetic media corresponds to the steepest magnitude gradient of the magnetic write field.

7. The method of claim 6, wherein a frequency of the magnetic write field is much less than a frequency of the high frequency magnetic field, and wherein the frequency of the high frequency magnetic field is equal to at least ten gigahertz (GHz).

8. A magnetic writer comprising:
a write pole; and
a coil adjacent the write pole having a current that includes a write current component and a high frequency component, wherein the write current component of the current generates a magnetic write field and the high frequency component of the current creates magnetic precession within the write pole that results in the generation of a high frequency magnetic field;
wherein the magnetic write field and the high frequency magnetic field are controlled to create an area of magnetic resonance within a magnetic media.

9. The magnetic writer of claim 8, wherein the high frequency component of the current is created by configuring a current generation circuit to produce high frequency oscillations in the current following a transition in the write current component from one direction to an opposite direction.

10. The magnetic writer of claim 8, wherein the high frequency component of the current is created by modulating the current with a high frequency current.

11. The magnetic writer of claim 8, wherein the area of magnetic resonance is dependent on the physical properties of the magnetic media, the frequency of the high frequency magnetic field, and the magnitude of the magnetic write field.

12. A magnetic head comprising:
a magnetic pole;
a coil adjacent the magnetic pole, the coil having a write current;
a magnetic media adjacent the magnetic pole; and
writing means for creating an area of magnetic resonance on a portion of the magnetic media, wherein the writing means introduces a high frequency signal to the write current by producing a high frequency oscillation in the write current following a transition in the write current component from one direction to an opposite direction.

13. The magnetic head of claim 12, wherein the high frequency signal creates magnetic precession within the magnetic pole, wherein the magnetic precession created within the magnetic pole creates a high frequency magnetic field.

14. The magnetic head of claim 12, wherein the write current generates a magnetic write field and the high frequency signal introduced to the write current generates a high frequency magnetic field, wherein the magnetic write field and the high frequency magnetic field interact to create the area of magnetic resonance within the magnetic media.

15. The magnetic head of claim 14, wherein the area of magnetic resonance within the magnetic media is dependent on the physical properties of the magnetic media, frequency of the high frequency magnetic field, and magnitude of the magnetic write field.

16. A magnetic writer comprising:
a write pole; and
a coil adjacent the write pole having a current that includes a write current component and a high frequency component, wherein the write current component generates a magnetic write field and the high frequency component generates a high frequency magnetic field;
wherein the write current component and the high frequency component are controlled such that the magnetic write field and the high frequency magnetic field interact to create an area of magnetic resonance within a magnetic media.

17. The magnetic writer of claim 16, wherein the high frequency component of the current is created by configuring a current generation circuit to produce high frequency oscillations in the current following a transition in the write current component from one direction to an opposite direction.

18. The magnetic writer of claim 16, wherein the high frequency component of the current is created by modulating the current with a high frequency current.

19. The magnetic writer of claim 16, wherein the area of magnetic resonance is dependent on the physical properties of the magnetic media, the frequency of the high frequency magnetic field, and the magnitude of the magnetic write field.

* * * * *

UNITED STATES PATENT AND TRADEMARK OFFICE
CERTIFICATE OF CORRECTION

PATENT NO. : 7,256,955 B2 Page 1 of 1
APPLICATION NO. : 10/802217
DATED : August 14, 2007
INVENTOR(S) : Taras G. Pokhil et al.

It is certified that error appears in the above-identified patent and that said Letters Patent is hereby corrected as shown below:

Column 1, Line 33, delete "a real density", insert --areal density--

Column 4, line 27, delete "maybe", insert --may be--

Signed and Sealed this

Twentieth Day of November, 2007

JON W. DUDAS
*Director of the United States Patent and Trademark Office*